June 11, 1957  W. H. MORRIS  2,795,149
BALL-BEARING SCREW ASSEMBLY
Filed Oct. 5, 1953  3 Sheets-Sheet 1
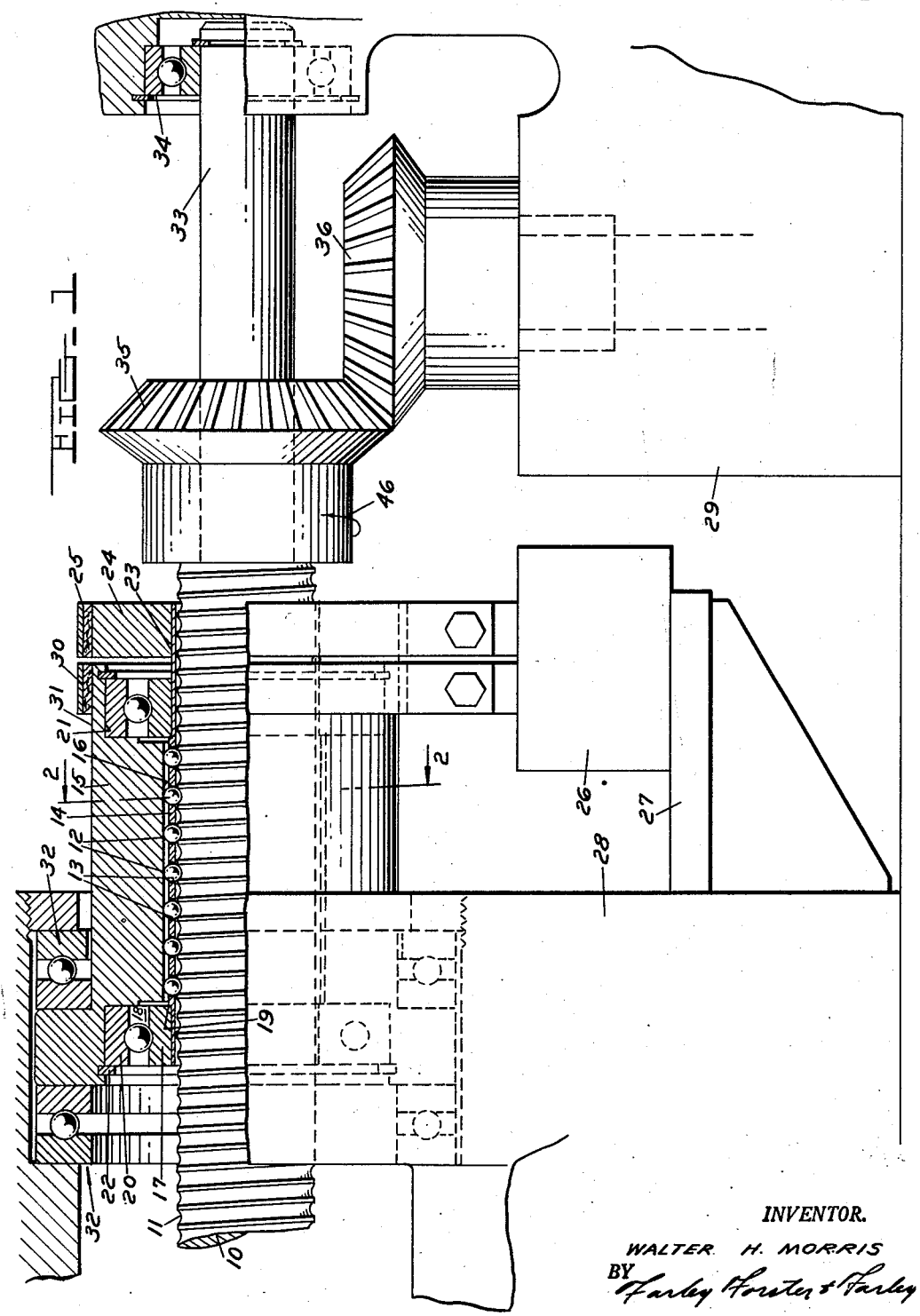
INVENTOR.
WALTER H. MORRIS
BY
*Farley Forster & Farley*
ATTORNEYS June 11, 1957  W. H. MORRIS  2,795,149
BALL-BEARING SCREW ASSEMBLY
Filed Oct. 5, 1953  3 Sheets-Sheet 2
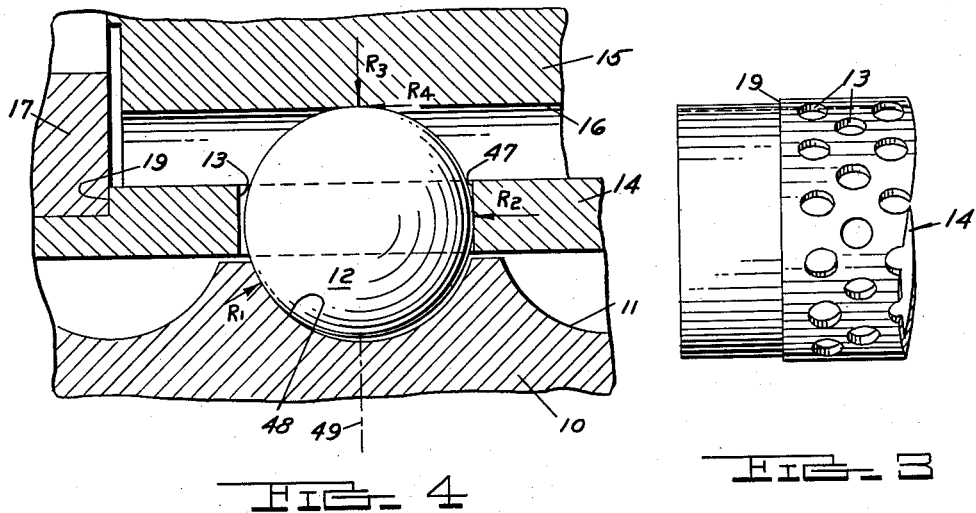
Fig. 4
Fig. 3
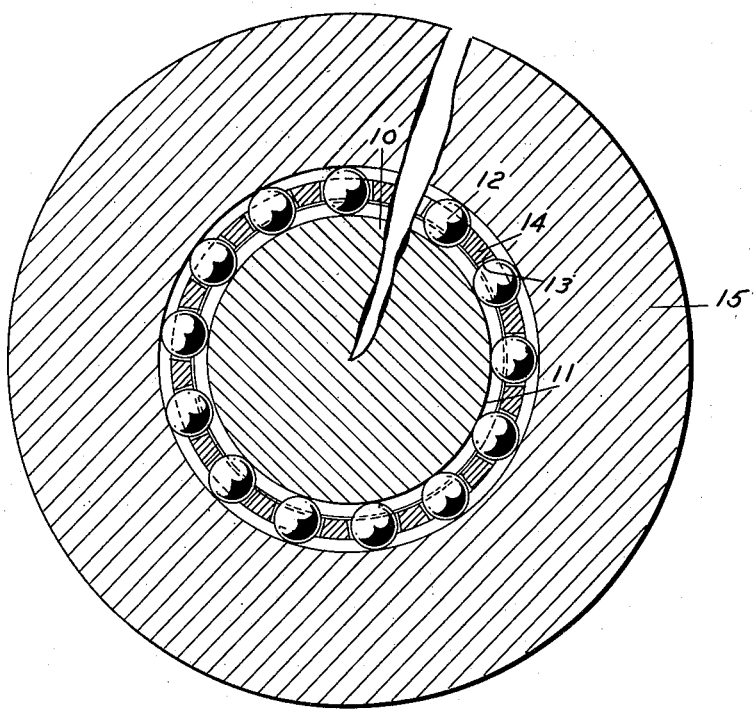
Fig. 2
INVENTOR.
WALTER H. MORRIS
BY
ATTORNEYS

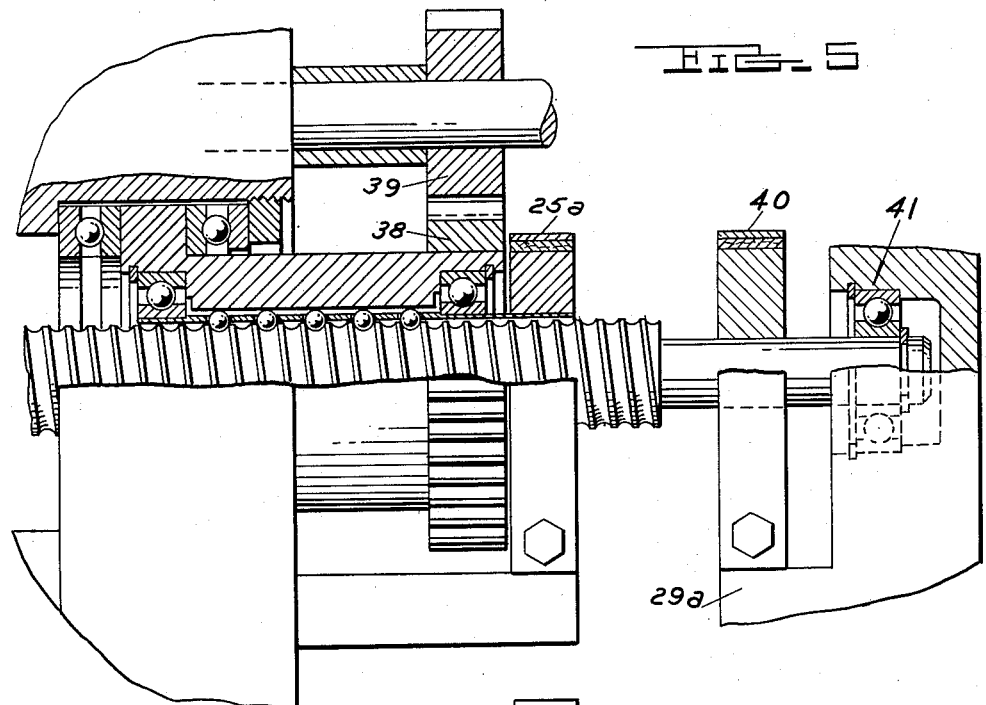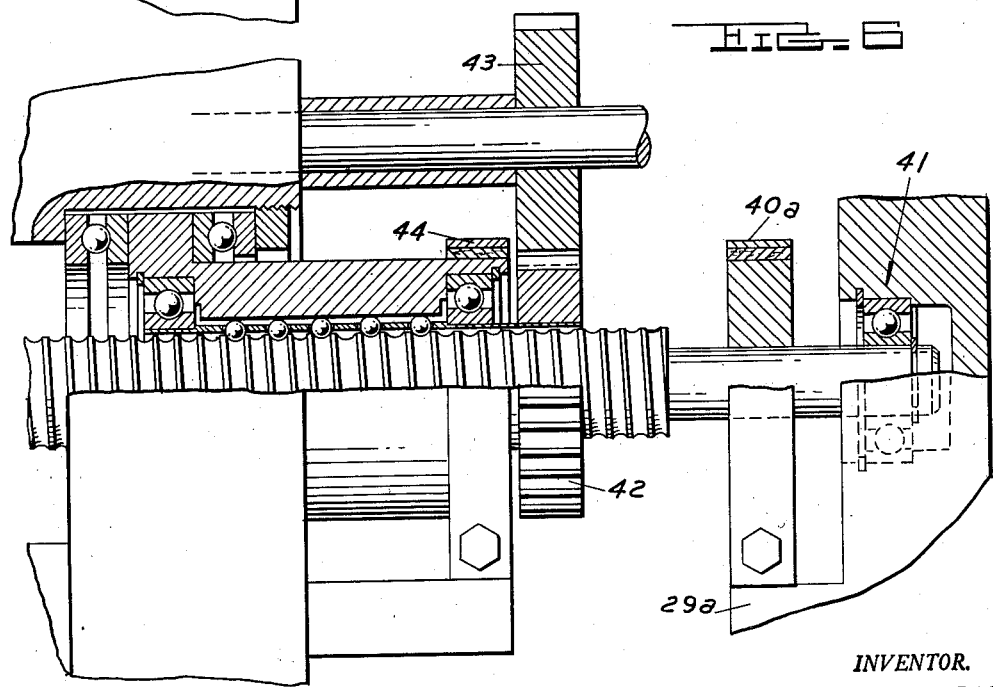

United States Patent Office 2,795,149
Patented June 11, 1957

2,795,149

BALL-BEARING SCREW ASSEMBLY

Walter H. Morris, Pontiac, Mich., assignor to Beaver Precision Products, Inc., Clawson, Mich., a corporation of Michigan Application October 5, 1953, Serial No. 384,226

26 Claims. (Cl. 74—424.8)

This invention relates to a ball bearing screw assembly together with alternative actuating means to provide desired lead relationship between respective screw and nut elements.

The conventional ball bearing screw assembly employs screw and nut elements each helically grooved to run on ball bearings inserted therebetween together with a return tube or other guide for returning the balls from one end of the nut thread to the other. In order to separate loaded balls from rubbing against each other, alternate balls of a smaller size may be inserted between the loaded balls. The screw assembly disclosed herein eliminates the helical groove in the nut element incorporating instead a smooth cylindrical surface therein and employs a cylindrical ball cage axially fixed within the nut element but freely rotatable relative thereto. Such ball cage is provided with individual ball apertures alignable with the helical groove in the screw element and balls inserted therein are adapted to engage simultaneously such grooves and the cylindrical surface of the nut element. With such arrangement the cage and balls are entirely confined within the inner cylindrical surface of the nut while the conventional requirements for a ball groove in the nut element and a return path for the balls in the form of an exterior tube or passage in the nut outside of the working surfaces are eliminated.

While the primary object leading to the development of the present construction related to reduction of manufacturing cost through elimination of the groove in the nut element and the return tube or other path for the balls, a number of concomitant unexpected results were discovered upon reducing the present construction to practice. Thus while the conventional ball bearing screw assembly with ball grooves in both screw and nut elements is characterized by reversible drive or "free-falling" features, the use of a comparable helical lead angle in the present construction was found to result in irreversible drive characteristics such that the nut element would not fall of its own weight or under any amount of thrust load even when complete freedom for rotation of the nut was preserved through the use of intermediate ball thrust bearings.

This feature of irreversible drive has particular importance in numerous applications where freedom of actuation characteristic of the ball bearing screw is desired but where it is also necessary to prevent a load from falling or actuating the screw assembly upon release of the normal actuating torque such as in the application to semi-trailer auxiliary wheel supports, jack assemblies and the like. While antifree-falling devices of various kinds have been developed for use with the conventional ball bearing screw assemblies, they have been characterized by the requirement for substantial back travel for actuation and have proved a troublesome complication in the use of ball bearing screw assemblies entirely avoided by the inherent characteristics of the present construction.

Another important characteristic of the present construction discovered after its initial development lies in the possibility of obtaining various differential reduction, overdrive and one-to-one lead speeds relative to the particular helix angle of the screw through choice of ball size and optional actuation of the respective elements. Thus, while the lead of a conventional ball bearing screw assembly is inherently limited to a one-to-one ratio (one thread advancement per revolution) regardless of whether the screw or nut element is actuated, the present construction provides a marked versatility in the choice of advance and return lead speeds and makes it possible, for example, in the case of a machine tool feed, to advance a tool head at a relatively slow rate and return the same at a much faster rate without change in the speed of the motor drive. Such versatility stems from the possibility of driving any one of the three main elements (screw, cage or nut) and restraining either of the other two elements against rotation while permitting the remaining element to rotate freely relative to the other two. This in turn provides six alternate possible combinations of drive with five different rates of feed relative to the lead of the helical screw thread, and in addition any of the differential or overdrive feed speeds may be modified through changing the ratio of diameters of the respective ball races. Such possibilities will be later described in detail in connection with specific applications.

Another novel aspect of the present construction discovered after initial development is the possibility of dividing the thrust load between the cage and nut elements in any desired proportion. Thus, while the interengagement of the balls with the cage and screw thread provide a positive and primary thrust coupling, axial and radial movement of the balls from a dead center position in the helical groove of the screw results in the transmission thereby of a thrust loading directly between the screw and nut elements. Such loading may be controlled, for example in the case of the preferred form of the groove having a radial cross section slightly in excess of the ball radius, by the amount of radial clearance provided between the balls and the respective engaging surfaces of the nut and screw elements. Such clearance, together with the unit ball thrust load to the extent of any slight deformation underload, will determine the portion of the groove with which the ball will make running contact and establish the effective pressure angle between the screw and ball elements. Such pressure may be balanced in part by normal pressure between the inner cylindrical surface of the nut and in part by pressure against the cage wall. However, if the radial running clearance is made small so that the pressure angle between the ball and groove lies close to a true radial line, the thrust engaging pressure between the ball and cage elements may be substantially if not entirely eliminated. On the other hand, where heavy thrust loads are encountered which would result in excessive radial pressures in the case of a small radial clearance between the ball groove and nut surfaces, an increase in such clearance will permit the ball to run at a greater angular displacement from the radial center line of the groove reducing the radial pressure load on the nut element, and, if desired, placing a predetermined portion of the thrust load on the cage element.

By providing suitable antifriction bearings between the cage and nut elements and by providing a close running clearance between the inner surface of the cage and the outermost surface of the screw elements any desired radial clearance may be provided between the respective ball groove and nut elements without introducing play in the coaxial alignment of the respective screw, cage and nut elements.

The depth of groove in the present construction need be no greater than will include the path of the ball therein under maximum thrust load.

Where radial running clearances are small, a relatively shallow groove may be employed in the screw element which will not only minimize machining operations on such element but will also provide the possibility of utilizing a relatively small helix angle and large ball size in order to secure desired feed ratios and load capacities with a minimum number of balls and length of nut.

From the above brief description it will be understood that the principal object of the present invention is to eliminate the requirements for a threaded nut and return tube in a ball bearing screw assembly.

Another object is to provide a ball bearing screw assembly wherein alternative feed ratios may be obtained relative to a given helical thread lead.

Another object is to provide a ball bearing screw assembly having inherent irreversible drive characteristics while substantially retaining desired freedom from frictional resistance to actuation.

Another object is to provide a ball bearing screw assembly employing an axially fixed rotatable ball cage within the nut element to operate as a primary thrust sustaining member.

Another object is to adapt such construction to at least partially transmit thrust directly between the screw and nut elements.

Another object is to adapt such cage element to external braking means.

Another object is to adapt both nut and cage elements to alternative braking means in order to obtain different relative feed speeds.

Another object is to provide a threaded screw, ball cage and nut assembly basically adapted to actuation through rotation of any of such three elements and restraint against rotation of either of the remaining two elements.

Another object is to adapt such assembly to operate under any of the above conditions with either the screw or the nut and cage as axially fixed members.

These and other objects will be more apparent from the following detailed description of a particular embodiment and several examples of typical applied actuating arrangements together with an examination of the drawings disclosing the same wherein:

Fig. 1 is a partially sectional side elevation of the basic screw, ball cage and nut assembly wherein the screw is rotated to actuate the feed and wherein either the nut or the cage may be restrained against rotation.

Fig. 2 is a sectional view taken along the line 2—2 of Fig. 1.

Fig. 3 is a fragmentary view of the left end of the cage element shown in Fig. 1.

Fig. 4 is an enlarged fragmentary view of the screw, cage and nut elements including the single ball shown at the left end of the cage in Fig. 1.

Fig. 5 is a view similar to Fig. 1 wherein the nut is rotated to actuate the feed and wherein either the cage or the screw may be restrained against rotation.

Fig. 6 is a view similar to Fig. 1 wherein the cage is rotated to actuate the feed and wherein either the nut or the screw may be restrained against rotation.

Referring to Fig. 1 it will be seen that a screw 10 is provided with a single helical groove 11 having a circular arc contour adapted to engage balls 12 of a slightly smaller radius retained in circumferentially spaced relation within circular apertures 13 in a cylindrical cage 14 within an outer nut element 15 having a cylindrical bore 16 adapted to engage the outer extremities of the balls 12. The inner races 17 of ball bearings 18 engage shoulders 19 at either end of the cage 14 while the outer race 20 of each bearing 18 is seated within a cylindrical recess 21 at either end of the nut 15, being axially retained in fixed relation thereto by a snap ring 22. The righthand end of the cage 15 is provided with an extension 23 passing beyond the right-hand margin of the nut 15. An annular disc 24 fixed on the cage extension 23 is capable of being restrained against rotation by a brake band 25 mounted by suitable means 26, 27 on a portion of a machine 28 transversely movable as seen in Fig. 1 relative to another portion 29 of such machine. A second brake band 30, similarly mounted, is adapted to engage a cylindrical outer surface 31 of the nut 15 to restrain such nut against rotation. The nut 15 is restrained against axial movement relative to the machine portion 28 by a pair of thrust bearings 32 which permit free rotation of the nut under thrust load when the brake 30 is released. An extension shaft 33 of the screw 10 engages a suitable thrust bearing 34 mounted in the machine portion 29 and is rotatably driven by a beveled gear 35 fixed to such shaft through a second bevel gear 36 driven by suitable means not shown.

In operation, if the screw 10 is rotated while the nut 15 is restrained against rotation by brake 30 and brake 25 is released, the helical thread 11 will drive the balls 12 around the stationary surface 16 of the nut 15 and the free cage 14 will rotate with the balls in the same direction as but at a slower speed than the screw 10 thereby moving the cage 14 and nut 15 in an axial direction relative to the screw 10 at a differential rate less than one thread per revolution of the screw 10. A unit thread lead of the nut and associated machine portion 28 will occur when the screw is rotated 360° relative to the cage which will in turn occur when the screw has rotated almost two revolutions relative to the nut.

The exact fraction of unit thread lead per revolution of the screw is a function of the effective root diameter ($d$) of the screw, the internal diameter ($D$) of the nut, and the helical angle ($a$) of the thread as expressed by the formula $$1 - \frac{(\sec a)d}{D + (\sec a)d}$$

Thus if the balls are relatively small and the corresponding race diameters relatively close to equal, the effective lead will be only slightly greater than one half of the unit thread lead while if the ball size is increased and the difference in corresponding race diameters is correspondingly increased, the fraction of unit thread lead per revolution of the screw may be made correspondingly larger.

When the screw is employed as the driving member, the nut freed for rotation and the cage restrained against rotation by the application of brake 25, on the other hand, each revolution of the screw will produce a complete unit thread lead relative to the nut and cage assembly.

As an example of a practical application for these different ratios of lead the assembly shown in Fig. 1 may be employed to feed the tool head of a machine tool at a relatively slow rate during a cutting operation through the application of brake 30 and at a relatively fast rate during the return stroke of the tool head through the application of brake 25.

Referring to Fig. 5 the same basic ball, screw, cage and nut assembly is shown with the nut adapted to operate as the driving member for such assembly through the provision of suitable driving gears 38, 39. In this adaptation alternative braking means 25a and 40 are selectively operable to restrain the respective cage and screw elements against rotation while bearing 41 permits free rotation of the screw relative to machine portion 29a when brake 40 is released. When the nut is driven, the cage freed, and the brake 40 is applied restraining the screw against rotation, the cage will again advance at a differential speed making a fractional revolution about the screw for each complete revolution of nut travel equal to $$\frac{D}{D + (\sec a)d}$$

which fraction is in this case directly equal to the fraction of unit thread lead of the assembly per revolution of the nut.

If the screw brake 40 is released and the cage is held through the application of brake 25a, the screw will be rotated at a rate faster than the nut producing more than a single thread lead per nut revolution as expressed by the formula $$\frac{D}{(\sec a)d}$$

Referring to Fig. 6 a further adaptation of the same basic screw assembly is shown employing the cage as the driving element through suitable drive gears 42, 43 and a brake 44 is provided to selectively restrain the nut against rotation wtih a similar brake 40a provided for the screw as in the case of Fig. 5. With this arrangement, when the screw is restrained against rotation, a single thread lead will result per revolution of the cage; while if brake 40a is released and brake 44 is applied restraining the nut from rotation, the screw will be driven to produce a reverse multiple unit thread lead per revolution of the cage equal to $$\frac{D+(\sec a)d}{(\sec a)d}-1$$

It will be understood that in each of the adaptations shown in Figs. 1, 5 and 6 either the screw or the nut and cage assembly may be mounted in axially fixed relationship relative to the stationary portion of the machine so that in all a total of twelve different driving arrangements are possible including five different rates of lead, four of which are in the same lead direction and one in a reverse lead direction for a given rotational direction of the driving element.

With reference to Fig. 4 the operation of the forces transmitted through the balls and interaction of the respective screw, cage and nut elements may be at least partially explained. For example, in the case illustrated in Fig. 1, assuming the screw is rotated in the direction indicated by arrow 46, the helical lead of the thread 11 will initially move the ball 12 against the righthand wall 47 of the cage 14 and toward the left side 48 of the associated groove 11 in screw 10. The slope in the left portion 48 of the groove 11 will produce a radially outward movement of the ball into firm engagement with the cylindrical surface 16 of the nut 15 whereupon progressive thrust loading will lead to the production of three main reaction forces R–1, R–2 and R–3 in the respective screw, cage and nut elements. While the principal reaction force R–3 is normal to the cylindrical surface 16 contacted by the ball, a frictional reaction force R–4 operates to oppose a portion of the axial component of the reaction force R–1 and relieves the cage 14 of at least a portion of the thrust load. It will be understood that the reaction center line R–1 will approach more closely the radial center line 49 of the groove if the running clearance between the groove and cylindrical surface 16 is reduced and that the frictional component R–4 resisting the thrust may be thereby increased under the relatively higher reaction pressure R–3 or, on the other hand, by increasing the running clearance, the reaction center line R–1 may be caused to move further from the groove center line 49 placing a greater proportion of the thrust load on the cage 14 balanced by the reaction force R–2.

Experimental investigation has revealed that when the radial running clearance are relatively small, no perceptible wear will occur in the cage wall which operates as a pivotal axis for the ball with rolling contact occurring on the respective nut and screw surfaces. It will be noted in this connection that the center line of the ball lies radially within the inner and outer cylindrical wall surfaces of the cage to assure pivotal rather than rubbing contact between the balls and the cage aperture walls.

While the same general distribution of forces will obtain whenever the cage is employed as the free-running element, regardless of whether the screw or nut is the driving element, a somewhat greater rubbing action will occur in the aperture walls of the cage when such element is employed as the stationary reaction or driving element due to the attending necessity for the cage to supply drive reaction or driving forces as well as thrust reaction. Accordingly, the preferred mode of operation where maximum thrust and actuating loads are involved is that employing the cage as a free-running element.

Referring to Fig. 3, it will be noted that the ball apertures in the cage are spaced to provide a staggered relationship along the helical turns in order to provide maximum wall thickness between adjacent apertures. The actual spacing and number of such apertures can, of course, be varied to suit the load conditions for which the ball-screw assembly is designed.

From the above description it will be understood that a ball-screw assembly has been disclosed which meets each of the objects set forth herein. While a particular preferred embodiment of the basic assembly has been disclosed in detail, together with several alternative driving arrangements, it will be understood that numerous modifications in detail construction might be resorted to without departing from the scope of my invention as set forth in the following claims.

I claim:

1. A ball-bearing screw assembly comprising in combination a cylindrical shaft having a continuous helical groove of substantially constant lead formed in the outer surface thereof, a co-axial cylindrical ball cage having ball apertures arranged along a helical angle corresponding to that of said groove in a manner whereby a single plane normal to the axis of said assembly may pass through a plurality of said apertures, an outer thrust-sustaining nut element encircling said cage, end bearings holding said cage in axially fixed rotatable relationship to said nut, and balls in said cage apertures adapted to engage said groove and the internal surface of said nut, said screw, nut and cage elements being assembled in relatively rotatable operative relationship.

2. A ball-bearing screw assembly comprising in combination a cylindrical shaft having a continuous helical groove of substantially constant lead formed in the outer surface thereof, a co-axial cylindrical ball cage having radially cylindrical ball apertures arranged along a helical angle corresponding to that of said groove in a manner whereby a single plane normal to the axis of said assembly may pass through a plurality of said apertures, an outer thrust-sustaining nut element encircling said cage in axially fixed and freely rotatable relationship thereto, and balls in said cage apertures adapted to engage said groove and the internal surface of said nut, said screw, nut and cage elements being assembled in relatively rotatable operative relationship.

3. A ball-bearing screw assembly comprising in combination a cylindrical shaft having a continuous helical groove of substantially constant lead formed in the outer surface thereof, a co-axial cylindrical ball cage having ball apertures arranged along a helical angle corresponding to that of said groove in a manner whereby a single plane normal to the axis of said assembly may pass through a plurality of said apertures, an outer thrust-sustaining nut element encircling said cage, end bearings holding said cage in axially fixed rotatable relationship to said nut, and balls in said cage apertures adapted to engage said groove and the internal surface of said nut, the centers of said balls lying within the radial extremities of said cage, said screw, nut and cage elements being assembled in relatively rotatable operative relationship.

4. A ball-bearing screw assembly comprising in combination a cylindrical shaft having a continuous helical groove of substantially constant lead formed in the outer surface thereof, a co-axial cylindrical ball cage having ball apertures arranged along a helical angle corresponding to that of said groove in a manner whereby a single plane normal to the axis of said assembly may pass through a plurality of said apertures, an outer thrust-sustaining nut element encircling said cage, end bearings holding said cage in axially fixed rotatable relationship to said nut, and balls in said cage apertures adapted to engage said groove and the internal surface of said nut, all of said balls lying between the enclosing adjacent surfaces of said shaft and nut throughout all operating positions, said screw, nut and cage elements being assembled in relatively rotatable operative relationship.

5. A ball-bearing screw assembly comprising in combination a cylindrical shaft having a continuous helical groove of substantially constant lead formed in the outer surface thereof, a co-axial cylindrical ball cage having ball apertures arranged along a helical angle corresponding to that of said groove in a manner whereby a single plane normal to the axis of said assembly may pass through a plurality of said apertures, an outer thrust-sustaining nut element encircling said cage, end bearings interposed between said cage and nut elements having race and rolling elements adapted to fix the axial and radial relationship of said cage and nut elements and to transmit thrust loads therebetween while providing for free relative rotation, and balls in said cage apertures adapted to engage said groove and the internal surface of said nut, said screw, nut and cage elements being assembled in relatively rotatable operative relationship.

6. A ball-bearing screw assembly comprising in combination a cylindrical shaft having a continuous helical groove of substantially constant lead formed in the outer surface thereof, a co-axial cylindrical ball cage having ball apertures arranged along a helical angle corresponding to that of said groove, an outer thrust-sustaining nut element encircling said cage in axially fixed and freely rotatable relationship thereto having a smooth, cylindrical internal surface, and balls in said cage apertures adapted to engage said groove and the cylindrical surface of said nut, said screw, nut and cage elements being assembled in relatively rotatable operative relationship.

7. A ball-bearing screw assembly comprising in combination a cylindrical shaft having a continuous helical groove of substantially constant lead formed in the outer surface thereof, a co-axial cylindrical ball cage having ball apertures arranged along a helical angle corresponding to that of said groove in a manner whereby a single plane normal to the axis of said assembly may pass through a plurality of said apertures, an outer thrust-sustaining nut element encircling said cage, end bearings holding said cage in axially fixed rotatable relationship to said nut, and balls in said cage apertures adapted to engage said groove and the internal surface of said nut, one end of said cage extending axially beyond the corresponding extremity of said nut, said screw, nut and cage elements being assembled in relatively rotatable operative relationship.

8. A ball-bearing screw assembly comprising in combination a cylindrical shaft having a continuous helical groove of substantially constant lead formed in the outer surface thereof, a co-axial cylindrical ball cage having ball apertures arranged along a helical angle corresponding to that of said groove in a manner whereby a single plane normal to the axis of said assembly may pass through a plurality of said apertures, an outer thrust-sustaining nut element encircling said cage, end bearings holding said cage in axially fixed rotatable relationship to said nut, and balls in said cage apertures adapted to engage said groove and the internal surface of said nut, said groove having a circular arc cross-section substantially less than 180°, said screw, nut and cage elements being assembled in relatively rotatable operative relationship.

9. A ball-bearing screw assembly comprising in combination a cylindrical shaft having a continuous helical groove of substantially constant lead formed in the outer surface thereof, a co-axial cylindrical ball cage having ball apertures arranged along a helical angle corresponding to that of said groove in a manner whereby a single plane normal to the axis of said assembly may pass through a plurality of said apertures, an outer thrust-sustaining nut element encircling said cage, end bearings holding said cage in axially fixed rotatable relationship to said nut, and balls in said cage apertures adapted to engage said groove and the internal surface of said nut, said groove having a circular arc cross-section of a radius exceeding that of said balls, said screw, nut and cage elements being assembled in relatively rotatable operative relationship.

10. A ball-bearing screw assembly comprising in combination a cylindrical shaft having a continuous helical groove of substantially constant lead formed in the outer surface thereof, a co-axial cylindrical ball cage having ball apertures arranged along a helical angle corresponding to that of said groove in a manner whereby a single plane normal to the axis of said assembly may pass through a plurality of said apertures, said apertures being spaced to provide a staggered relationship between adjacent apertures over adjacent groove turns, an outer thrust-sustaining nut element encircling said cage in axially fixed and freely rotatable relationship thereto, and balls in said cage apertures adapted to engage said groove and the internal surface of said nut, said screw, nut and cage elements being assembled in relatively rotatable operative relationship.

11. A ball-bearing screw-actuated assembly comprising two relatively movable members, a cylindrical shaft element axially fixed to one of said members having a continuous helical groove of substantially constant lead formed in the outer surface thereof, a co-axial cylindrical ball cage element having ball apertures arranged along a helical angle corresponding to that of said groove in a manner whereby a single plane normal to the axis of said assembly may pass through a plurality of said apertures, a co-axial outer thrust-sustaining nut element encircling said cage axially fixed to said cage and to the other of said members, said cage being freely rotatable relative to said nut, balls in said cage apertures adapted to engage said groove and the internal surface of said nut, means for rotating one of said three co-axial elements, and means for restraining a second of said three co-axial elements against rotation, said screw, nut and cage elements being assembled in relatively rotatable operative relationship.

12. A ball-bearing screw-actuated assembly as set forth in claim 11 wherein said means for rotating one of said elements is mounted on the member to which said element is axially fixed.

13. A ball-bearing screw-actuated assembly as set forth in claim 11 wherein the means for restraining the second of said elements against rotation is mounted on the member to which said element is axially fixed.

14. A ball-bearing screw-actuated assembly as set forth in claim 11 wherein the means for restraining said second element against rotation is releasable, and wherein said assembly includes alternative releasable means for restraining the third of said three co-axial elements against rotation.

15. A ball-bearing screw-actuated assembly as set forth in claim 11 wherein said shaft is employed as the driving element for said assembly.

16. A ball-bearing screw-actuated assembly as set forth in claim 11 wherein said cage is employed as the driving element for said assembly.

17. A ball-bearing screw-actuated assembly as set forth in claim 11 wherein said nut is employed as the driving element for said assembly.

18. A ball-bearing screw-actuated assembly as set forth in claim 11 wherein said shaft is employed as the driving element for said assembly, and said nut is restrained against rotation.

19. A ball-bearing screw-actuated assembly as set forth in claim 11 wherein said shaft is employed as the driving element for said assembly and said cage is restrained against rotation.

20. A ball-bearing screw-actuated assembly as set forth in claim 11 wherein said nut is employed as the driving element for said assembly and wherein said shaft is restrained against rotation.

21. A ball-bearing screw-actuated assembly as set forth in claim 11 wherein said nut is employed as the driving element for said assembly and said cage is restrained against rotation.

22. A ball-bearing screw assembly as set forth in claim 11 wherein said cage is employed as the driving element for said assembly and said nut is restrained against rotation.

23. A ball-bearing screw assembly as set forth in claim 11 wherein said cage is employed as the driving element for said assembly and said shaft is restrained against rotation.

24. A ball-bearing screw assembly inherently incapable of actuation through gravity or thrust loading, comprising in combination a cylindrical shaft having a continuous helical groove of substantially constant lead formed in the outer surface thereof, a co-axial cylindrical ball cage having ball apertures arranged on a helical angle corresponding to that of said groove in a manner whereby a single plane normal to the axis of said assembly may pass through a plurality of said apertures, an outer thrust-sustaining nut element encircling said cage in axially fixed and freely rotatable relationship thereto, and balls in said cage apertures adapted to engage said groove and the internal surface of said nut, said screw, nut and cage elements being assembled in relatively rotatable operative relationship.

25. A ball-bearing screw assembly adapted to transmit thrust between screw and nut elements by both positive and frictional means, comprising in combination a cylindrical shaft having a continuous helical groove of substantially constant lead formed in the outer surface thereof, a co-axial cylindrical ball cage having ball apertures arranged along a helical angle corresponding to that of said groove, an outer thrust-sustaining nut element encircling said cage in axially fixed and freely rotatable relationship thereto having a smooth, cylindrical internal surface, and balls in said cage apertures adapted to engage said groove and the internal surface of said nut, the radial running clearance and the surface of said groove at the point at which said running clearance is taken up being adapted to create a line of pressure between said groove and said ball such as to distribute the thrust component of said pressure through the ball in part to the walls of the cage apertures and in part directly to the cylindrical surface of said nut element through the frictional engagement of said balls, said screw, nut and cage elements being assembled in relatively rotatable operative relationship.

26. A ball-bearing screw assembly comprising a cylindrical shaft having a continuous helical groove of substantially constant lead forming the outer surface thereof, a co-axial cylindrical ball cage having ball apertures arranged along a helical angle corresponding to that of said groove in a manner whereby a single plane normal to the axis of said assembly may pass through a plurality of said apertures, an outer thrust-sustaining nut element encircling said cage in axially fixed and freely rotatable relationship thereto, balls in said cage apertures adapted to engage said groove and the internal surface of said nut, said cage extending axially at one end beyond the outer margin of said nut, and annular means connected to said cage extension adapting said cage for external braking, said screw, nut and cage elements being assembled in relatively rotatable operative relationship.

References Cited in the file of this patent

UNITED STATES PATENTS

| | | |
|---|---|---|
| 111,923 | Findlay et al. | Feb. 21, 1871 |
| 150,313 | Findlay et al. | Apr. 28, 1874 |
| 1,347,006 | Boas | July 20, 1920 |
| 2,054,760 | Selnes | Sept. 15, 1936 |
| 2,424,492 | Morris | July 22, 1947 |
| 2,446,393 | Russell | Aug. 3, 1948 |